United States Patent
Ogisu et al.

(10) Patent No.: US 7,522,269 B2
(45) Date of Patent: Apr. 21, 2009

(54) BONDED PART PEELING SHAPE IDENTIFICATION DEVICE

(75) Inventors: Toshimichi Ogisu, Tokyo (JP); Tomonaga Okabe, Sendai (JP); Hideki Sekine, Sendai (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/811,866

(22) Filed: Jun. 12, 2007

(65) Prior Publication Data

US 2008/0008385 A1    Jan. 10, 2008

(30) Foreign Application Priority Data

Jun. 14, 2006    (JP) .............................. 2006-164752

(51) Int. Cl.
   *G01B 11/16*    (2006.01)
(52) U.S. Cl. ........................................ 356/32; 356/601
(58) Field of Classification Search ................... 356/32, 356/601
   See application file for complete search history.

(56) References Cited

U.S. PATENT DOCUMENTS

| | | | | |
|---|---|---|---|---|
| 5,399,854 A | * | 3/1995 | Dunphy et al. | 250/227.17 |
| 5,770,155 A | * | 6/1998 | Dunphy et al. | 422/82.05 |
| 7,041,960 B2 | * | 5/2006 | Sato | 250/227.18 |
| 2004/0206893 A1 | * | 10/2004 | Sato | 250/227.14 |
| 2006/0045408 A1 | * | 3/2006 | Jones et al. | 385/12 |

FOREIGN PATENT DOCUMENTS

| | | | |
|---|---|---|---|
| JP | 2002-062118 | | 2/2002 |
| JP | 2003295008 A | * | 10/2003 |
| JP | 2004-108890 | | 4/2004 |
| JP | 2004-333378 | | 11/2004 |

* cited by examiner

*Primary Examiner*—Roy M Punnoose
(74) *Attorney, Agent, or Firm*—Smith, Gambrell & Russell LLP

(57) ABSTRACT

A bonded part peeling shape identification device includes: a processor for obtaining measurement value information indicating a spectrum from an output light of an optical fiber sensor arranged in a bonded part, the optical fiber sensor outputting a light in which the spectrum is changed according to a strain; for carrying out a first shape identification calculation using a strain calculated based on the measurement value information, and a second shape identification calculation by a spectral shape of the output light based on the measurement value information; and for identifying a peeling shape of the bonded part based on an identification result of the first shape identification calculation and an identification result of the second shape identification calculation.

19 Claims, 3 Drawing Sheets

BONDED PART PEELING SHAPE IDENTIFICATION DEVICE

BACKGROUND OF THE INVENTION

1. Field of the Invention

The present invention relates to a bonded part peeling shape identification device which identifies a shape of peeling in a bonded part of a structure by using an optical fiber sensor.

2. Description of the Related Art

Conventionally, as described in Patent Documents 1 to 3, devices for measuring strains in structures by using optical fiber sensors have been proposed.

According to an invention described in the Patent Document 1, a strain of a blade to be driven so as to rotate is measured to obtain time history data of a load applied on the blade.

According to an invention described in the Patent Document 2, a plurality of optical fiber sensors are arranged in an object to be measured, and a position and the amount of strain in the object to be measured are obtained based on a shifting amount of a wavelength of Brillouin scattered light having strain information of the optical fiber sensors and arrangement positions of the optical fiber sensors.

However, the objects of the inventions of the Patent Documents 1 and 2 are not to detect peeling caused in structures. According to the inventions of the Patent Documents 1 and 2, the theory or the technical means for detecting peeling caused in the structure are not provided. Still more, a shape of peeling cannot be identified.

On the other hand, according to an invention described in Patent Document 3, a strain in a structure is measured by using an optical fiber sensor, and a result of the measurement is applied to the peeling detection.

That is, according to the invention of the Patent Document 3, in a structure in which ERP is bonded and fixed to concrete, optical fiber sensors are arranged on a bonded surface of the concrete and that of the FRP, and a frequency distribution of Brillouin scattered light which is reflected light from each optical fiber sensor is analyzed to measure a strain of a predetermined position in a longitudinal direction of each optical fiber sensor. When the difference in measurement values in the same position on the concrete side and the FRP side is not less than a predetermined value, it is determined that a bonded state between the concrete and the FRP is bad. The peeling detection is carried out.

Patent Document 1: Japanese Patent Application Laid-open No. 2004-333378

Patent Document 2: Japanese Patent Application Laid-open No. 2004-108890

Patent Document 3: Japanese Patent Application Laid-open No. 2002-62118

In the invention of the Patent Document 3, there are some problems described below.

According to the invention of the Patent Document 3, optical fiber sensors have to be installed in both of the two members bonded together to detect the peeling.

According to the invention of the Patent Document 3, a shape of peeling cannot be identified even though the presence of peeling or the position thereof can be detected.

SUMMARY OF THE INVENTION

The present invention is made to solve the problems of the above prior art. An object of the invention is to provide a bonded part peeling shape identification device capable of accurately identifying a shape of peeling caused in a bonded part of a structure by using an optical fiber sensor.

Another object is to provide a bonded part peeling shape identification device capable of visually displaying an identified peeling shape.

In accordance with a first aspect of the invention, a bonded part peeling shape identification device comprises:

a processor for obtaining measurement value information indicating a spectrum from an output light of an optical fiber sensor arranged in a bonded part, the optical fiber sensor outputting a light in which the spectrum is changed according to a strain; for carrying out a first shape identification calculation using a strain calculated based on the measurement value information, and a second shape identification calculation by a spectral shape of the output light based on the measurement value information; and for identifying a peeling shape of the bonded part based on an identification result of the first shape identification calculation and an identification result of the second shape identification calculation.

Preferably, the first shape identification calculation uses a strain calculated based on a theoretical value information obtained by a theoretical value analysis, and minimizes a residual sum of squares between the strain calculated based on the measurement value information and the strain calculated based on the theoretical value information.

Preferably, the second shape identification calculation uses a spectral shape calculated based on a theoretical value information obtained by a theoretical value analysis, and minimizes a residual sum of squares between the spectral shape calculated based on the measurement value information and the spectral shape calculated based on the theoretical value information.

Preferably, the processor carries out identification based on the identification result of the first shape identification calculation and the identification result of the second identification calculation by executing one of the first shape identification calculation and second shape identification calculation with the identification result of the other shape identification calculation as an initial value.

Preferably, the processor alternately repeats the first shape identification calculation and the second shape identification calculation by using a preceding identification result as an initial value of a subsequent shape identification calculation.

Preferably, in the first shape identification calculation, when a difference between the strain calculated based on the theoretical value information obtained by the theoretical value analysis and the strain calculated based on the measurement value information exceeds a threshold value, the identification result is excluded from the initial value.

Preferably, the bonded part peeling shape identification device further comprises an image display device for graphically displaying the peeling shape of the bonded part, which is identified by the processor, and an arrangement of the peeling shape in the bonded part.

According to the invention, the first shape identification calculation which uses the measured strain, and the second shape identification calculation by the spectral shape of the output light of the optical fiber sensor are carried out, and the peeling shape of the bonded part is identified based on the identification results of both calculations. Thus, it is possible to accurately identify the shape of the peeling caused in the bonded part.

According to the invention, the identified peeling shape of the bonded part is graphically displayed together with the arrangement thereof in the bonded part. Thus, the identified peeling shape can be visually displayed to a user, and the peeling shape can be easily recognized by the user.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

DETAILED DESCRIPTION OF PREFERRED EMBODIMENT

The preferred embodiment of the present invention will be described below with reference to the accompanying drawings. It should be understood that the following description is the explanation of one embodiment of the present invention and that the invention is not limited to this.

Figure 1A:
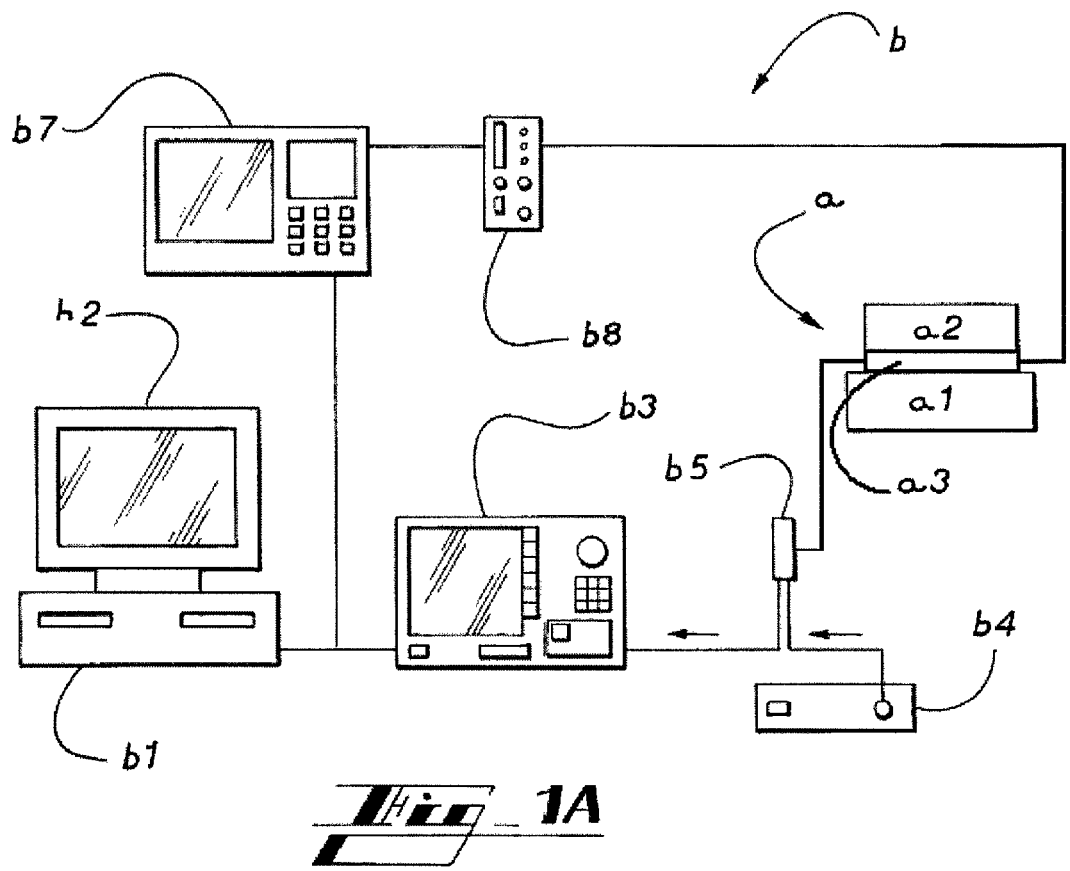
FIG. 1A is a schematic view showing a structure and a bonded part peeling shape identification device for analyzing the structure and FIG. 1B is an enlarged perspective view of the structure according to an embodiment of the present invention.

FIG. 1A is a schematic view showing a structure and a bonded part peeling shape identification device for analyzing the structure. The structure "a" shown in FIG. 1B includes an outer plate a1 of an aircraft wing, a hat type longitudinal member a2, and an adhesive layer a3 including an adhesive for bonding and fixing the outer plate a1 and the hat type longitudinal member a2 together.

The bonded part peeling shape identification device "b" includes a processor b1, an image display device b2, an optical spectrum analyzer b3, a light source b4, an optical circulator b5, a sensing optical fiber b6, an A/D converter b7, and an amplifier b8.

Figure 1B:
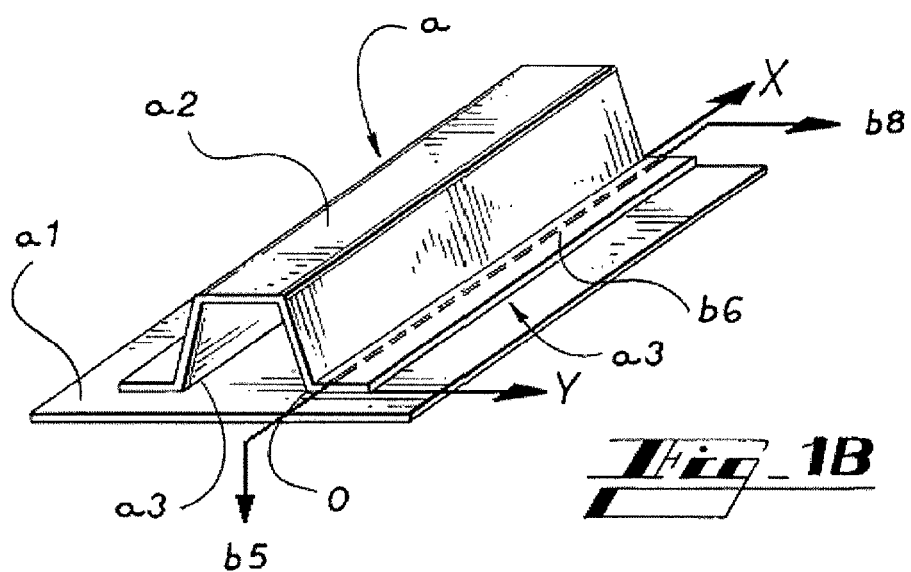

As shown in FIG. 1B, the optical fiber b6 is buried in the adhesive layer a3 to be arranged in a longitudinal direction of the hat type longitudinal member a2. A plurality of optical fibers b6, b6, . . . including the optical fiber b6 of FIG. 1B are spaced in parallel.

Figure 2:
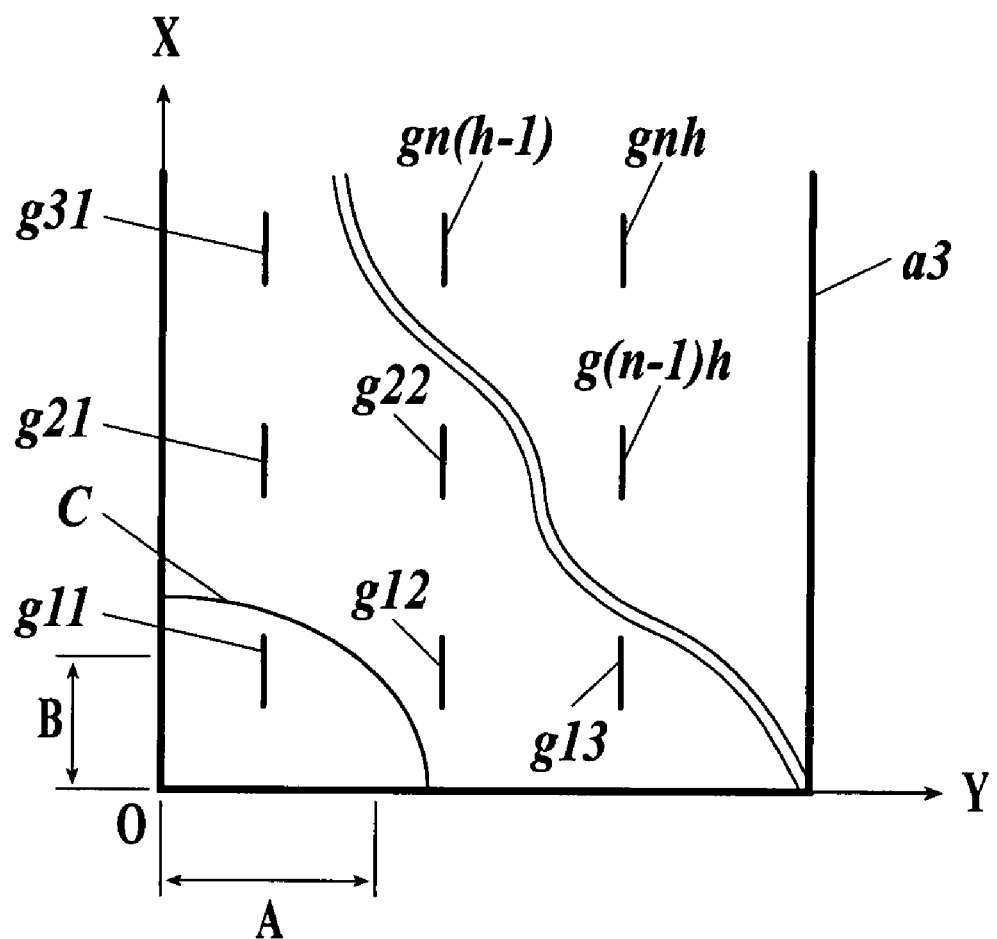
FIG. 2 is a plan view showing a bonded layer of X-Y coordinates in which a point O shown in FIG. 1B is an original point.

In the structure "a", peeling starts from an inner corner of a bonded surface of the hat type longitudinal member a2. One peeling is a point O shown in FIG. 1B. The drawing shows X-Y coordinates in which the point O is an original point. FIG. 2 shows the X-Y coordinates and an outer shape of the adhesive layer a3.

The optical fiber b6 includes a plurality of Fiber Bragg Grating (FBG) optical fiber sensors. In other words, a plurality of gratings are formed in a core of the optical fiber b6 to reflect a predetermined wavelength light. These gratings are sensor part. According to the embodiment, as shown in FIG. 2, gratings "g" are formed in n rows and h columns. The gratings are represented by g11 to gn1, g12 to gn2, . . . g1h to gnh, respectively.

The light source b4 emits illumination lights which cover predetermined wavelength bands to the core of the optical fiber b6. The lights are propagated through the core of the optical fiber b6, and only light having a specific wavelength is selectively reflected by the gratings "g". The gratings (g11, g21 to gn1) of one optical fiber b6 are formed so that reflection characteristics of wavelength bands, which are different from each other, are provided.

Stress of the structure "a" causes strain in the gratings "g".

When strain is caused in the gratings "g", the wavelength of the reflected light is changed by the change (elongation or contraction) of the grating space of the gratings "g". In other words, when the strain of the gratings "g" is changed, the wavelength of the reflected light fluctuates according to the amount of strain. This fluctuation includes the change in a spectral shape of the reflected light or the shift of the entire spectrum including a peak wavelength.

Accordingly, predetermined wavelength bands of the light source b4 cover fluctuated wavelength bands of reflected light wavelengths of all the gratings g11 to gn1, g12 to gn2, . . . g1h to gnh.

The optical circulator b5 makes the light from the light source b4 go to the optical fiber b6 side, and enters the reflected light returned from the gratings "g" to the optical spectrum analyzer b3.

The optical spectrum analyzer b3 separates reflected lights inputted in serial from one optical fiber b6 into reflected lights from each grating (g11, g21, . . . gn1) to convert them in parallel, and converts spectral signals of the separated reflected lights into electric signals to output them to the outside. The A/D conversion is carried out for the output of the spectrum analyzer b3 through an interface (not shown) to be input to the processor b1.

Thus, the processor b1 obtains spectrum information of each of gratings g11 to gn1, g12 to gn2, . . . g1h to gnh. Based on a peak wavelength of a spectrum indicated by the spectrum information, the processor b1 calculates strain for each of the gratings g11 to gn1, g11 to gn2, . . . g1h to gnh by using a correlation between the peak wavelength of the reflected light spectrum and the strain. The processor b1 calculates strain as an average of a certain sampling period or the number of sampling times.

Processing contents for identifying a peeling shape will be described.

By the aforementioned process, the processor b1 obtains spectrum information of each of the gratings g11 to gn1, g12 to gn2, . . . g1h to gnh, and obtains a measurement value of the strain from the spectrum information by calculation the value. The processor b1 previously stores information of position coordinates of the gratings g11 to gn1, g12 to gn2, . . . g1h to gnh. The processor b1 correlates spectrum information with corresponding position coordinates to store the information as spectrum measurement value information. Similarly, the processor b1 correlates each measurement value of the strain with corresponding position coordinates to store the value as strain measurement value information.

The peeling shape identification of the bonded part is carried out based on the measurement value information and theoretical value information obtained from theoretical analysis (finite element analysis or optical analysis) based on attribute information of the structure "a" and load conditions. The attribute information of the structure "a" contains geometrical information of the structure "a" and physical property information of components. For the load conditions, as a load assumed in a steady state of the wing, a predetermined in-plane load parallel to the adhesive layer a3 is applied on the structure "a".

According to the embodiment, the peeling shape identification of the bonded part is carried out by minimizing a residual sum of squares between the measurement value and the theoretical value. Specifically, the following two minimizing processes are carried out.

One is shape identification which uses strain information (first shape identification calculation). In the X-Y coordinates of FIG. 2, a shape of a peeling tip "c" is approximately represented by Equation (1) in which A, B and α are variable values.

$$\left(\frac{X}{A}\right)^\alpha + \left(\frac{Y}{B}\right)^\alpha = 1 \qquad \text{Equation 1}$$

The shape identification that uses the strain information is realized by optimization in which a function of Equation (2) is minimized when $\epsilon_i$ is X-axis average strain obtained by finite element analysis as strain theoretical value information (variable values: A, B and α) and $\omega_i$ is X-axis average strain by the strain measurement value information.

Here, N is the total number of measured points. The total number of measured points is the total number of gratings g11 to gn1, g12 to gn2, . . . g1h to gnh used for the identification. When all are used, N=n×h is satisfied. When only some are used, information obtained from the gratings arranged around the peeling (around the original point O) is used. The BFGS variable measurement method is used as an optimization method. As a 1-dimension search, hoarding and polynomial approximation are used.

$$F = \frac{\sum_{i=1}^{N}(\epsilon_i - \omega_i)^2}{\sum_{i=1}^{N}(\omega_i)^2} \qquad \text{Equation 2}$$

When the shape identification using this strain information is carried out, an obtained identification result is a local minimum solution of a target function of the Equation (2) in many cases. As a result, the accuracy of the shape identification is reduced.

Thus, in the embodiment, shape identification (second shape identification calculation) which uses a reflected light spectral shape indicated by the spectrum information obtained by the processor b1 is carried out.

That is, the processor b1 approximates the reflected light spectral shape indicated by the obtained spectrum information by Fourier series, and identifies a bonded part peeling shape based on the coefficient thereof. As an optical analysis method for calculating the reflected light spectral shape, the strain obtained by the finite element analysis is used, and the spectral shape is calculated by a transmission matrix method.

The shape identification that uses the reflected light spectral shape is realized by optimization in which a function F of Equation 3 is minimized when $a_m$ is m-order Fourier coefficient regarding the reflected light spectral shape obtained by the finite element analysis as theoretical value information (variable values: A, B and α) and $b_m$ is m-order Fourier coefficient regarding the reflected light spectral shape by the spectrum measurement value information. The BFGS variable measurement method is used as an optimization method. As a 1-dimension search, hoarding and polynomial approximation are used.

$$F = \frac{\sum_{m=1}^{M}(a_m - b_m)^2}{\sum_{m=1}^{M}(b_m)^2} \qquad \text{Equation 3}$$

According to the embodiment, the two methods are combined, and the processor b1 executes calculation for bonded part peeling shape identification in the following order.

(Step 1)

In the bonded part peeling shape identification, a value of average strain in the gratings "g" is greatly different depending on whether a sensor, i.e., the gratings "g", is included in a peeling area. In other words, in the peeling area, there is a great difference between average strain obtained as theoretical value information and average strain as measurement value information. Accordingly, in the shape identification, when Equation (4) is satisfied in any one of the sensors, they are removed from initial values.

$$\frac{(\epsilon_i - \omega_i)^2}{(\omega_i)^2} > e \quad \text{where} \quad i = 1, \ldots, N \qquad \text{Equation 4}$$

Here, e is a threshold value. This threshold value is a parameter decided based on a shape or the like of the bonded part of the structure, and is empirically obtained by experiment.

(Step 2: first shape identification calculation)

Next, the shape identification that uses the strain information is carried out. In other words, the optimization calculation is carried out to approximate a value of the function F of the Equation (2) to 0.

(Step 3: second shape identification calculation)

Then, the shape identification that uses the reflected light spectral shape is carried out. In other words, the optimization calculation is carried out to approximate a value of the function F of the Equation (3) to 0. In this case, an optimal solution calculated by the optimization calculation of the step 2 is used as an initial value.

The steps 2 and 3 are alternately repeated until the values of the target function equations (2) and (3) are not more than threshold values. These threshold values are parameters decided based on a shape of the bonded part of the structure, and is empirically obtained by experiment. In this case, in each step, an optimal solution calculated by the optimization calculation of the last step is taken over as an initial value. Hence, the identification can be carried out accurately.

Figure 3A:
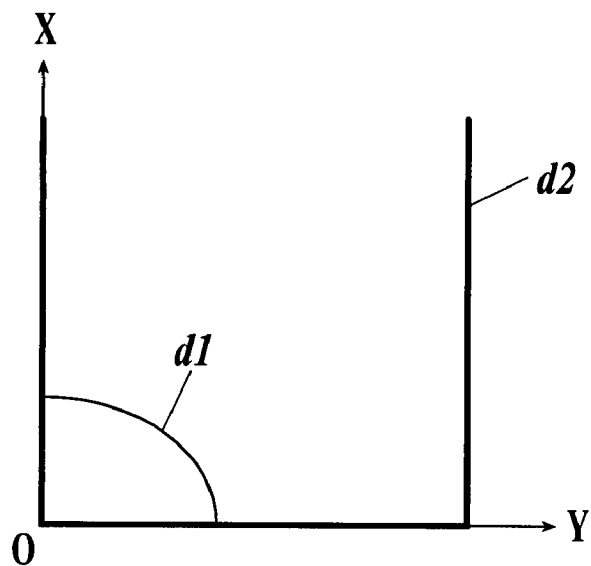
FIGS. 3A and 3B are examples of graphic displays of a peeling shape according to the embodiment of the invention, FIG. 3A showing a 2-dimensional graphic display example, and FIG. 3B showing a 3-dimensional graphic display example.
Figure 3B:
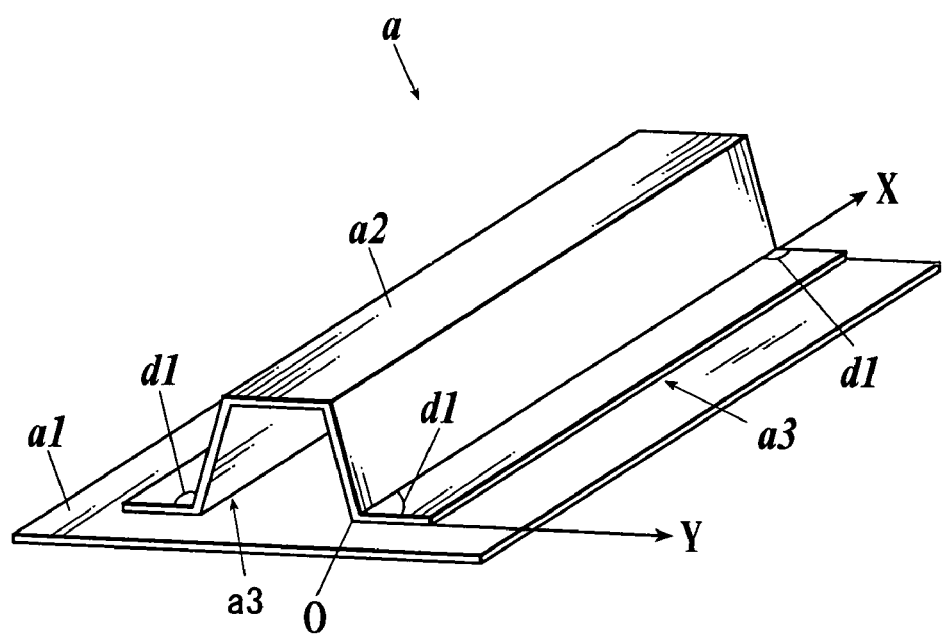

Based on the solutions (A, B and α) obtained by the aforementioned calculation, and the equation (1), the processor b1 specifies a shape of the peeing tip to display it on the image display device b2. In the image display device b2, as shown in FIGS. 3A and 3B, the identified peeling shape of the adhesive layer a3 is graphically displayed together with the arrangement thereof on the adhesive layer a3. FIG. 3A shows a 2-dimensional display, and FIG. 3B shows a 3-dimensional display. In FIGS. 3A and 3B, d1 is a line of the peeling tip identified by the bonded part peeling identification device "b". In FIG. 3A, d2 is an outer shape line of the adhesive layer a3.

As a result, the bonded part peeling shape can be visually displayed to the user, and the peeling shape can be easily recognized by the user.

According to the embodiment, the first shape identification calculation is carried out first. However, the second shape identification calculation may be carried out first.

The entire disclosure of Japanese Patent Application No. 2006-164752 filed on Jun. 14, 2006 is incorporated herein by reference in its entirety.

What is claimed is:

1. A bonded part peeling shape identification device comprising:
   a processor for obtaining measurement value information indicating a spectrum from an output light of an optical fiber sensor arranged in a bonded part, the optical fiber sensor outputting a light in which the spectrum is changed according to a strain; for carrying out a first shape identification calculation using a strain calculated based on the measurement value information, and a second shape identification calculation by a spectral shape of the output light based on the measurement value information; and for identifying a peeling shape of the bonded part based on an identification result of the first shape identification calculation and an identification result of the second shape identification calculation.

2. The bonded part peeling shape identification device as claimed in claim 1,
   wherein the first shape identification calculation uses a strain calculated based on a theoretical value information obtained by a theoretical value analysis, and minimizes a residual sum of squares between the strain calculated based on the measurement value information and the strain calculated based on the theoretical value information.

3. The bonded part peeling shape identification device as claimed in claim 1,
   wherein the second shape identification calculation uses a spectral shape calculated based on a theoretical value information obtained by a theoretical value analysis, and minimizes a residual sum of squares between a first Fourier coefficient calculated based on the measurement value information and a second Fourier coefficient calculated based on the theoretical value information.

4. The bonded part peeling shape identification device as claimed in claim 1,
   wherein the processor carries out identification based on the identification result of the first shape identification calculation and the identification result of the second identification calculation by executing one of the first shape identification calculation and second shape identification calculation with the identification result of the other shape identification calculation as an initial value.

5. The bonded part peeling shape identification device as claimed in claim 4,
   wherein in the first shape identification calculation, when a difference between the strain calculated based on the theoretical value information obtained by the theoretical value analysis and the strain calculated based on the measurement value information exceeds a threshold value, the identification result is excluded from the initial value.

6. The bonded part peeling shape identification device as claimed in claim 1,
   wherein the processor alternately repeats the first shape identification calculation and the second shape identification calculation by using a preceding identification result as an initial value of a subsequent shape identification calculation.

7. The bonded part peeling shape identification device as claimed in claim 1, further comprising
   an image display device for graphically displaying the peeling shape of the bonded part, which is identified by the processor, and an arrangement of the peeling shape in the bonded part.

8. The bonded part peeling shape identification device as claimed in claim 1,
   wherein the bonded part comprises a member and an adhesive layer.

9. The bonded part peeling shape identification device as claimed in claim 8,
   wherein the optical fiber sensor is embedded in the adhesive layer.

10. A debonded shape identification device comprising:
    a processor for obtaining spectrum information based on a reflected light outputted from a optical fiber sensor arranged in a bonded part; and for identifying a debonded shape by defining a boundary based on the spectrum information, wherein said boundary is represented by a following Equation (1) including X and Y as two dimensional position coordinate of the boundary and A, B and α as variable values:

$$(X/A)\alpha + (Y/B)\alpha = 1 \qquad \text{Equation (1)}.$$

11. The debonded shape identification device as claimed in claim 10, wherein the processor calculates the boundary in such a way that a residual sum of squares between a first strain calculated based on the spectrum information and a second strain calculated based the variable values of the Equation (1) is minimized.

12. The debonded shape identification device as claimed in claim 10, wherein the processor calculates the boundary in such a way that a residual sum of squares between a first Fourier coefficient calculated based on the spectrum information and a second Fourier coefficient calculated based on the variable values of the Equation (1) is minimized.

13. The debonded shape identification device as claimed in claim 10,
    wherein the processor calculates the boundary by executing one of a first debonded shape identification calculation and a second debonded shape identification calculation with an identification result of the other debonded shape identification calculation as an initial value, and
    wherein the first debonded shape identification calculation calculates the boundary in such a way that a residual sum of squares between a first strain calculated based on the spectrum information and a second strain calculated based the variable values of the Equation (1) is minimized, and the second debonded shape identification calculation calculates the boundary in such a way that a residual sum of squares between a first Fourier coefficient regarding calculated based on the spectrum information and a second Fourier coefficient calculated on the variable values of the Equation (1) is minimized.

14. The debonded shape identification device as claimed in claim 13,
    wherein the processor alternately repeats the first debonded shape identification calculation and the second debonded shape identification calculation by using a preceding identification result as an initial value of a subsequent shape identification calculation.

15. The debonded shape identification device as claimed in claim 13,
    wherein in the first deboned shape identification calculation, when a difference between a first strain calculated based on the spectrum information and a second strain calculated based the variable values of the Equation (1)

exceeds a threshold value, the identification result is excluded from the initial value.

16. The debonded shape identification device as claimed in claim 13, further comprising
an image display device for graphically displaying the boundary of the debonded part.

17. The debonded shape identification device as claimed in claim 10, further comprising
an image display device for graphically displaying the boundary of the debonded part.

18. The debonded shape identification device as claimed in claim 10,
wherein the bonded part comprises a member and a adhesive layer.

19. The debonded shape identification device as claimed in claim 18,
wherein the optical fiber sensor is embedded in the adhesive layer.

* * * * *